(12) United States Patent
Lee et al.

(10) Patent No.: US 10,065,524 B2
(45) Date of Patent: Sep. 4, 2018

(54) METHOD AND APPARATUS FOR CONTROLLING OUTPUT OF FUEL CELL

(71) Applicant: Hyundai Motor Company, Seoul (KR)

(72) Inventors: Seung Heon Lee, Gyeonggi-do (KR); Sung Gone Yoon, Gyeonggi-do (KR); Jae Won Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 147 days.

(21) Appl. No.: 15/138,580

(22) Filed: Apr. 26, 2016

(65) Prior Publication Data

US 2017/0203665 A1      Jul. 20, 2017

(30) Foreign Application Priority Data

Jan. 19, 2016   (KR) .................. 10-2016-0006490

(51) Int. Cl.
    *B60L 11/18*        (2006.01)
(52) U.S. Cl.
    CPC ....... *B60L 11/1861* (2013.01); *B60L 11/1881* (2013.01)
(58) Field of Classification Search
    CPC .................. B60L 11/1861; B60L 11/1881
    USPC ........................................... 320/101
    See application file for complete search history.

(56) References Cited

U.S. PATENT DOCUMENTS

| | | | | |
|---|---|---|---|---|
| 6,255,008 B1* | 7/2001 | Iwase | ................ | B60L 11/1881 180/65.275 |
| 7,996,124 B2* | 8/2011 | Kwon | ................ | B60L 11/005 363/95 |
| 8,815,458 B2 | 8/2014 | Furusawa et al. | | |
| 9,034,495 B2* | 5/2015 | Umayahara | ....... | H01M 8/04619 429/432 |
| 9,509,004 B2* | 11/2016 | Jomori | ................ | B60L 3/0053 |
| 2004/0018399 A1* | 1/2004 | Jung | ................ | B60L 11/1881 429/9 |
| 2010/0131138 A1* | 5/2010 | Song | ................ | B60L 11/1887 701/22 |
| 2011/0053015 A1 | 3/2011 | Walz et al. | | |
| 2014/0336855 A1* | 11/2014 | Kwon | ................ | B60L 11/1885 701/22 |
| 2014/0368028 A1* | 12/2014 | Kwon | ................ | B60L 3/0046 307/9.1 |

FOREIGN PATENT DOCUMENTS

| | | | |
|---|---|---|---|
| JP | 2007-073473 | A | 3/2007 |
| JP | 2007-109568 | A | 4/2007 |
| JP | 2010-129245 | A | 6/2010 |
| JP | 2010-129293 | A | 6/2010 |

(Continued)

*Primary Examiner* — Samuel Berhanu
*Assistant Examiner* — Tessema Kebede
(74) *Attorney, Agent, or Firm* — Mintz Levin Cohn Ferris Glovsky and Popeo, P.C.; Peter F. Corless

(57) ABSTRACT

A method and apparatus for controlling output of a fuel cell are provided. The apparatus includes a communicator that is configured to receive state information of a fuel cell and a controller that is configured to terminate charge of a battery by a power converting apparatus when a first voltage of the fuel cell is less than a preset second voltage as air supply of the fuel cell is stopped. Additionally, the controller is configured to activate a relay between the fuel cell and the battery to charge the battery when the first voltage is less than the second voltage.

12 Claims, 3 Drawing Sheets

(56) References Cited

FOREIGN PATENT DOCUMENTS

| JP | 2013-187941 A | 9/2013 |
|----|---------------|--------|
| KR | 10-2010-0137660 A | 12/2010 |
| KR | 10-2011-0057715 A | 6/2011 |

* cited by examiner

METHOD AND APPARATUS FOR CONTROLLING OUTPUT OF FUEL CELL

CROSS-REFERENCE TO RELATED APPLICATION(S)

This application claims the benefit of Korean Patent Application No. 10-2016-0006490, filed on Jan. 19, 2016, which is hereby incorporated by reference as if fully set forth herein.

BACKGROUND

Field of the Invention

The present invention relates to a fuel cell vehicle, and more particularly, to a method and apparatus for enhancing output efficiency of a fuel cell.

Discussion of the Related Art

A fuel cell system is a type of power generating system configured to convert chemical energy of fuel into electric energy in a fuel cell stack. However, when only a fuel cell is used as a power source of a vehicle, performance of the fuel cell is degraded since the fuel cell is in charge of all loads included in the vehicle and a sufficient amount of voltage required by a driving motor may not be supplied to degrade acceleration performance based on the output property whereby an output voltage is abruptly decreased in a high-speed driving region that requires a high voltage.

In addition, when a load is abruptly applied to a vehicle, an output voltage of a fuel cell is instantaneously and abruptly decreased and a sufficient amount of power may not be supplied to a driving motor to degrade vehicle performance (since electricity is generated based on a chemical reaction, an abrupt change in a load is beyond the fuel cell.) and a fuel cell may be unable to recover energy introduced from the driving motor during vehicle braking to degrade the efficiency of the vehicle system due to the unidirectional output property of the fuel cell.

Accordingly, a fuel cell hybrid vehicle has been developed in the related art. The fuel cell hybrid vehicle includes a high-voltage battery (or a super capacitor (super cap)) as an electricity accumulator as a separate power source configured to provide power required for motor driving as well as the fuel cell as a main power source. The fuel cell hybrid vehicle is driven by continuously outputting predetermined power from a fuel cell, and when power remains, a high-voltage battery is charged with the remaining power, and when power is insufficient (e.g., a low-output period of the fuel cell), the high-voltage battery complementarily outputs a voltage by as much as the insufficient amount of power to drive the vehicle.

The fuel cell hybrid vehicle may prevent use of the fuel cell in a period with low efficiency to enhance fuel efficiency via control for terminating an operation of the fuel cell in a low-output period and in particular, the fuel cell hybrid vehicle may be driven to stop power generation in the low-output period to enhance durability of the fuel cell hybrid vehicle. Particularly, the fuel cell hybrid vehicle may enhance fuel efficiency through a process of stopping and restarting power generation when necessary while vehicle is being driven (e.g., fuel cell stop/fuel cell restart procedures), that is, through an idle stop/release control procedure (e.g., an on/off control procedure for temporally stopping power generation of the fuel cell).

With regard to the method for embodying idle stop, various technologies have been developed, and in general, air supply of a fuel cell is stopped to prevent output generation. However, output is generated and present based on a reaction between hydrogen and the remaining air in the fuel cell when air supply is stopped. A fuel cell hybrid vehicle generally uses a method for charging a high-voltage battery using a main bus node to use output of a fuel cell and the main bus node is main power sources of many electronic loads, and thus the main bus node cannot have a low voltage equal to or less than a preset voltage. Accordingly, output of the fuel cell may be charged in the high-voltage battery up to a preset voltage region and output less than a preset voltage is consumed via self discharging. As a result, as output based on a reaction between hydrogen and remaining air in the fuel cell is self-discharged and a number of entrance times to idle stop increases, discharging output of the fuel cell accumulates to degrade fuel efficiency of the vehicle.

SUMMARY

Accordingly, the present invention provides a method and apparatus for controlling output of a fuel cell, for allowing output of a fuel cell, which was conventionally consumed via self discharging to a preset voltage or less, to be charged up to a preset voltage or less to enhance efficiency and fuel efficiency of a fuel cell by configuring an additional bus node between the fuel cell and a high-voltage battery (or a low-voltage battery) as well as a main bus node.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one aspect of the present invention, an apparatus for controlling a fuel cell may include a communicator configured to receive state information of a fuel cell, and a controller configured to terminate charge of a battery by a power converting apparatus when a first voltage of the fuel cell is less than a preset second voltage as air supply of the fuel cell is terminated, wherein the controller may be configured to activate a relay between the fuel cell and the battery to charge the battery when the first voltage is less than the second voltage.

Further, the controller may be configured to activate the relay when a first voltage of the fuel cell is less than a preset second voltage and first current of the fuel cell is less than preset second current. The relay may be connected in series between the fuel cell and the battery. The second voltage may be a voltage of a main bus node for connection of the fuel cell, the battery, and the motor.

In another aspect of the present invention, a method for controlling a fuel cell may include receiving state information of a fuel cell, terminating charging of a battery by a power converting apparatus when a first voltage of the fuel cell is less than a preset second voltage as air supply of the fuel cell is terminated, and activating a relay between the fuel cell and the battery to charge the battery when the first voltage is less than the second voltage. The activation of the relay to charge the battery may include activating the relay when a first voltage of the fuel cell is less than a preset second voltage and first current of the fuel cell is less than preset second current.

In another aspect of the present invention, a non-transitory computer readable recording medium has recorded thereon a program for executing the method.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
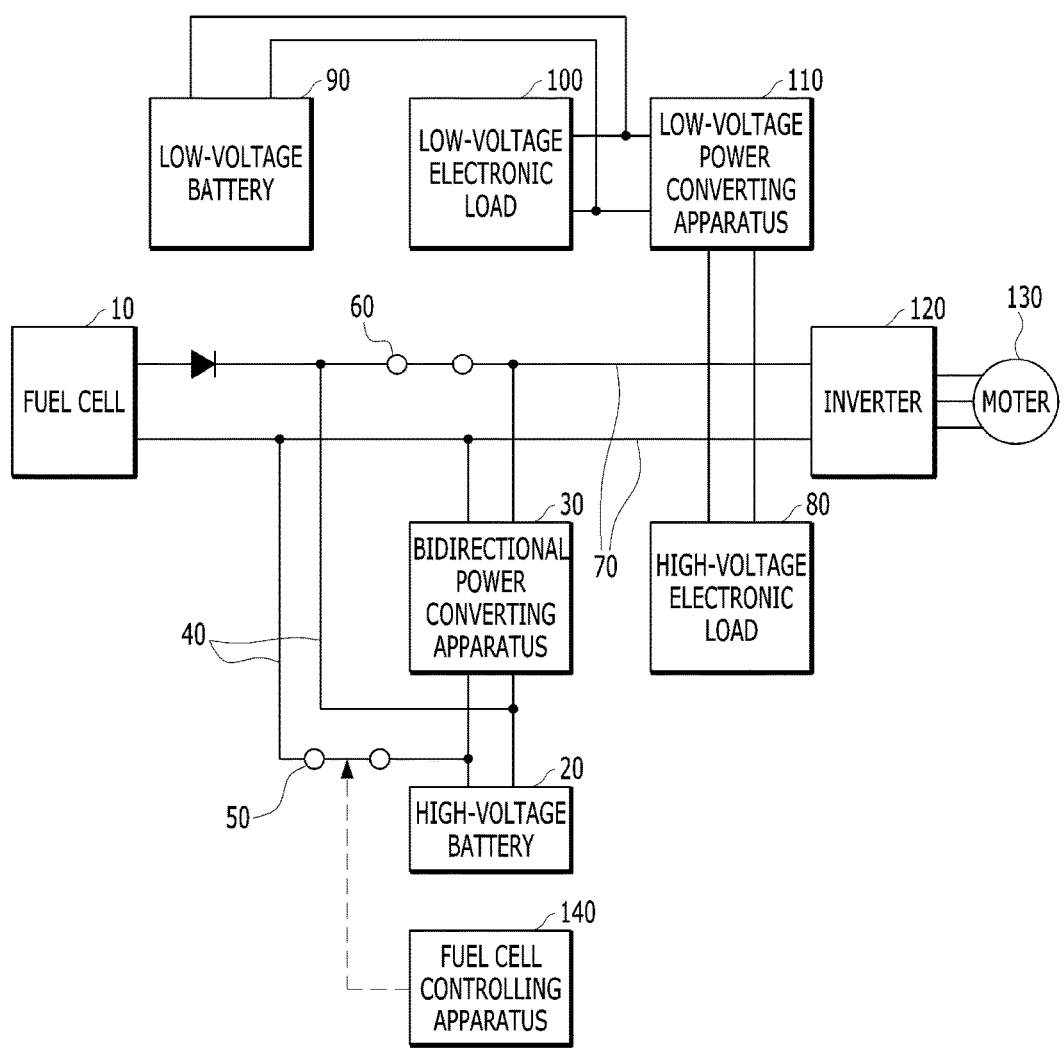
FIG. 1 is a diagram illustrating a structure of a fuel cell system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to apparatuses and various methods according to exemplary embodiments of the present invention, examples of which are illustrated in the accompanying drawings. The suffixes "module" and "unit" of elements herein are used for convenience of description and thus can be used interchangeably and do not have any distinguishable meanings or functions. In addition, in the following description of the present invention, a detailed description of known arts incorporated herein will be omitted when it may make the subject matter of the present invention unclear.

A fuel cell system may include a fuel cell stack configured to generate electric energy, a hydrogen supplying apparatus configured to supply hydrogen as a fuel to the fuel cell stack, an air (oxygen) supplying apparatus configured to supply oxygen in air required for an electrochemical reaction in the fuel cell stack, a thermal management system (TMS)/water management system configured to discharge reaction heat of the fuel cell stack out of the system, adjust a driving temperature of the fuel cell stack, and perform a water management function, and a fuel cell system controller configured to operate the fuel cell system. The fuel cell system may be configured to generate electricity via a reaction between oxygen in air and hydrogen as a fuel and discharge heat and water as byproduct of reaction using the aforementioned components.

Among these fuel cells, a fuel cell for a vehicle that has been researched is a proton exchange membrane fuel cell or a polymer electrolyte membrane fuel cell (PEMFC) which has highest power density of the fuel cells, and the proton exchange membrane fuel cell or the PEMFC may have short start time and short power converting reaction time due to a low operating temperature. In the fuel cell stack, hydrogen is supplied to an anode (which is also referred to as a 'fuel electrode') as a positive electrode and oxygen (air) is supplied to a cathode (which is also referred to as an 'air electrode' or 'oxygen electrode') as a negative electrode.

Further, hydrogen supplied to the positive electrode is dissociated into hydrogen protons (H+) and electrons (e−) by catalyst of electrode layers configured on opposite sides of an electrolyte membrane. Among these, only hydrogen protons are selectively transmitted to the negative electrode through the electrolyte membrane as a cation exchange membrane and simultaneously, electrons may be transmitted to the negative electrode through a gas diffusion layer and a separation layer as conductors. In particular, in the negative electrode, a reaction of generating water via contact between oxygen in air supplied to the negative electrode by the air supplying apparatus, and hydrogen protons supplied through the electrolyte membrane and electrons supplied through the separation layer may occur.

According to the movement of hydrogen protons, electron flow may occur through external wires, and current may be generated based on the electron flow. In addition, heat may be incidentally generated in the water generating reaction. An electrode reaction of the proton exchange membrane fuel cell may be represented below.

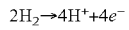  Reaction in fuel electrode

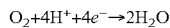  Reaction in air electrode

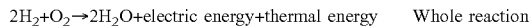  Whole reaction

In the related art for enhancing fuel efficiency of a hybrid vehicle including a fuel cell and an electricity accumulator, a technology has been developed for turning off a relay switch connected between the fuel cell and a high-voltage battery to disconnect output of the fuel cell during a low-output period (or when a voltage of a high-voltage battery is equal to or greater than a predetermined level) and turning on the relay switch to connect the output of the fuel cell when vehicle requirement output is increased or a voltage of a high-voltage battery is equal to or greater than a predetermined level. In particular, to embody idle stop, a bus node relay switch for disconnecting output of the fuel cell is required to be turned on/off and disconnection of the relay is required to be controlled separately.

In addition, in the related art, a technology has been developed for determining an idle state based on a wheel revolution count, whether a brake is operated, a state of charge (SOC), an electric load (electronic load), and the like with regard to conditions for performing idle stop to shut off power supply from the fuel cell and restarting power supply when a voltage of a high-voltage battery is decreased to a preset SOC value or less. Particularly, an idle stop entrance condition is very restrictive (when a vehicle is stopped, a load is a predetermined value or less, a brake is being operated, and an SOC value is a predetermined value or greater), a separate device such as a DC/DC chopper is required at a fuel cell side for idle stop, and the DC/DC chopper is connected directly to the high-voltage battery after being used to limit current during idle stop release.

However, as described above, according to the technologies of the related art, output only up to a preset voltage region may be charged in a high-voltage battery, and output less than a preset voltage is consumed via self discharging. Accordingly, the present invention provides a method and apparatus for controlling output of a fuel cell, for allowing output of a fuel cell, which was conventionally consumed via self discharging to a preset voltage or less, to be charged up to a preset voltage or less to enhance efficiency and fuel efficiency of a fuel cell by configuring an additional bus node between the fuel cell and a high-voltage battery (or a low-voltage battery) as well as a main bus node.

FIG. 1 is a diagram for explaining a structure of a fuel cell system according to an exemplary embodiment of the present invention. The fuel cell system according to an exemplary embodiment of the present invention may include a fuel cell, a battery, and a motor. FIG. 1 illustrates a hybrid system of a fuel cell 10 and a high-voltage battery 20 as an entire system power net to which the present invention may be applied.

Referring to FIG. 1, the high-voltage battery 20 as an electricity accumulator that is used as an auxiliary power source together with the fuel cell 10 may be connected in parallel to other electronic loads, and a main bus node 70 may be connected to an output side of the fuel cell 10 using a bidirectional power converting apparatus 30. Accordingly, the illustrated structure corresponds to a structure in which the fuel cell 10 and the high-voltage battery 20 as two power sources are connected in parallel to each electronic load in the system through the main bus node 70.

An inverter 120 for rotation of a motor 130 may be configured to output driving power to a vehicle to output sides of the fuel cell 10 and the high-voltage battery 20 via the main bus node 70. Additionally, the inverter 120 may be configured to phase-transform power supplied from the fuel cell 10 or the high-voltage battery 20 to drive the motor 130 based on a control signal applied from a fuel cell controlling apparatus 140. The bidirectional power converting apparatus 30 may be positioned at an output node of the high-voltage battery 20 and may be configured to DC/DC-convert and supply power output from the fuel cell 10 to be charged in the high-voltage battery 20 or may be configured to DC/DC-convert power output from the high-voltage battery 20 and supply the power to the motor 130 and each electronic load in the system.

The fuel cell system may include a high-voltage electronic load 80 and a low-voltage electronic load 100 as electronic loads. The high-voltage electronic load 80 that receives power to be driven, such as, an air conditioner and a heater may be connected to the main bus node 70 to be driven by output of the fuel cell 10 or the high-voltage battery 20. The fuel cell system may include a low-voltage power converting apparatus 110 for output conversion between high and low voltages connected to the main bus node 70. In addition, a low-voltage battery 90 may be connected to the fuel cell system using the low-voltage power converting apparatus 110 using a medium, and the low-voltage electronic load 100 may be connected to the low-voltage power converting apparatus 110.

The fuel cell system may further include a reverse voltage prevention diode at the output side of the fuel cell 10 and to prevent a surge voltage from being supplied to the fuel cell 10. The fuel cell controlling apparatus 140 may be configured to execute power generation of the fuel cell 10 and execute an overall operation based on the driving of the fuel cell system, such as control of driving and output of the bidirectional power converting apparatus 30 and control of the low-voltage power converting apparatus 110.

In the present invention, the fuel cell controlling apparatus 140 may be configured to adjust system driving based on voltage detecting signals in the system, that is, signals of a voltage detector configured to detect a voltage (e.g., a stack voltage) of the fuel cell 10, a voltage detector configured to detect a voltage of the main bus node 70, and a voltage detector configured to detect a voltage of the high-voltage battery 20.

Furthermore, the fuel cell controlling apparatus 140 may be configured to apply a control signal to a relay 60 and execute an on/off switching operation. In particular, the fuel cell controlling apparatus 140 may be configured to selectively provide power from the fuel cell 10 or the high-voltage battery 20 and to drive the motor 130 based on the on/off operation of the relay 60. An on/off control signal of the relay 60 may distinguish when a vehicle is driven using the fuel cell 10 as a power source and when the vehicle is driven using both the fuel cell 10 and the high-voltage battery 20 as a power source.

In a normal operating state, power from the fuel cell may be supplied to the motor 130 and also may be charged in the high-voltage battery 20. However, when an idle stop condition is satisfied in the normal operating state, air supply of the fuel cell 10 may be terminated to stop of power generation of the fuel cell 10. When the air supply is stopped, an output voltage of the fuel cell 10 may decrease and then a voltage of the bidirectional power converting apparatus 30 connected between the high-voltage battery 20 and the main bus node 70 and for adjusting output of the fuel cell 10 may decrease and may be maintained to a preset value.

Conventionally, output of the fuel cell 10 up to a preset value may be charged in the high-voltage battery 20, and output of the fuel cell 10, equal to or less than a preset value, may be self-discharged. However, according to an exemplary embodiment of the present invention, an additional bus node 40 may be connected between the fuel cell 10 and the high-voltage battery 20, and an additional relay 50 may be operated by the fuel cell controlling apparatus to charge the high-voltage battery with output of the fuel cell, equal to or less than a preset value. In particular, when an output voltage of the fuel cell is equal to or less than a preset value of the bidirectional power converting apparatus 30, the fuel cell controlling apparatus 140 may be configured to activate (ON) the additional relay 50 maintained in an off state while in a normal operating state to charge the high-voltage battery 20 with output of the fuel cell 10.

Figure 2:
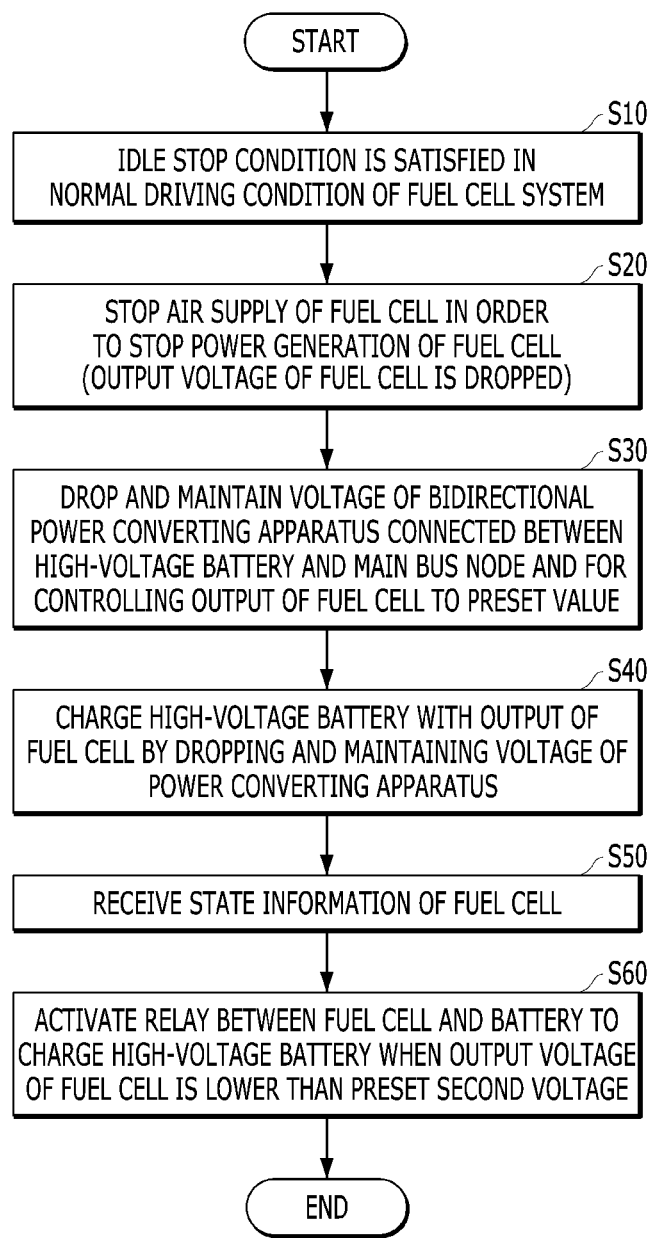
FIG. 2 is a flowchart illustrating a method for controlling output of a fuel cell according to an exemplary embodiment of the present invention.

FIG. 2 is a flowchart illustrating a method for controlling output of a fuel cell according to an exemplary embodiment of the present invention. Referring to FIG. 2, the fuel cell controlling apparatus 140 may be configured to determine whether an idle stop condition is satisfied in a normal driving mode of a fuel cell system (S10).

Particularly, the idle stop condition may be determined according to a vehicle in different ways and the fuel cell controlling apparatus 140 may be configured to receive vehicle state information and determine whether the idle stop condition is satisfied. When the idle stop condition is satisfied, the fuel cell controlling apparatus 140 may be configured to operate the fuel cell 10 to stop air supply to the fuel cell 10 to terminate power generation of the fuel cell 10 (S20). An output voltage of the fuel cell may be decreased by stopping the air supply to the fuel cell 10 and output may be generated by the reaction between hydrogen and air that remains in the fuel cell when air supply is stopped.

The idle stop condition may be satisfied when all of five sub conditions are satisfied. The five sub condition include 1) SOC of the high-voltage battery is greater than a predetermined value, 2) the stack temperature is greater than a predetermined temperature, 3) the pressure of the anode is greater than a predetermined pressure, 4) the fuel cell is not an emergency operation mode, 5) the communication for operating the air blower is in a normal state.

Further, the fuel cell controlling apparatus 140 may be configured to decrease and maintain a voltage of the bidirectional power converting apparatus 30 connected between the high-voltage battery 20 and the main bus node 70 and to adjust output of the fuel cell to a preset value (S30). As the voltage of the bidirectional power converting apparatus 30 is decreased and maintained, output of the fuel cell up to a preset value may be charged in the high-voltage battery 20 (S40).

The fuel cell controlling apparatus 140 may be configured to receive state information including output voltage information of the fuel cell (S50), and when an output voltage of the fuel cell 10 is less than a preset value, the fuel cell controlling apparatus 140 may be configured to activate the additional relay 50 between the fuel cell 10 and the battery to charge the high-voltage battery 20 with the output voltage (S60).

Figure 3:
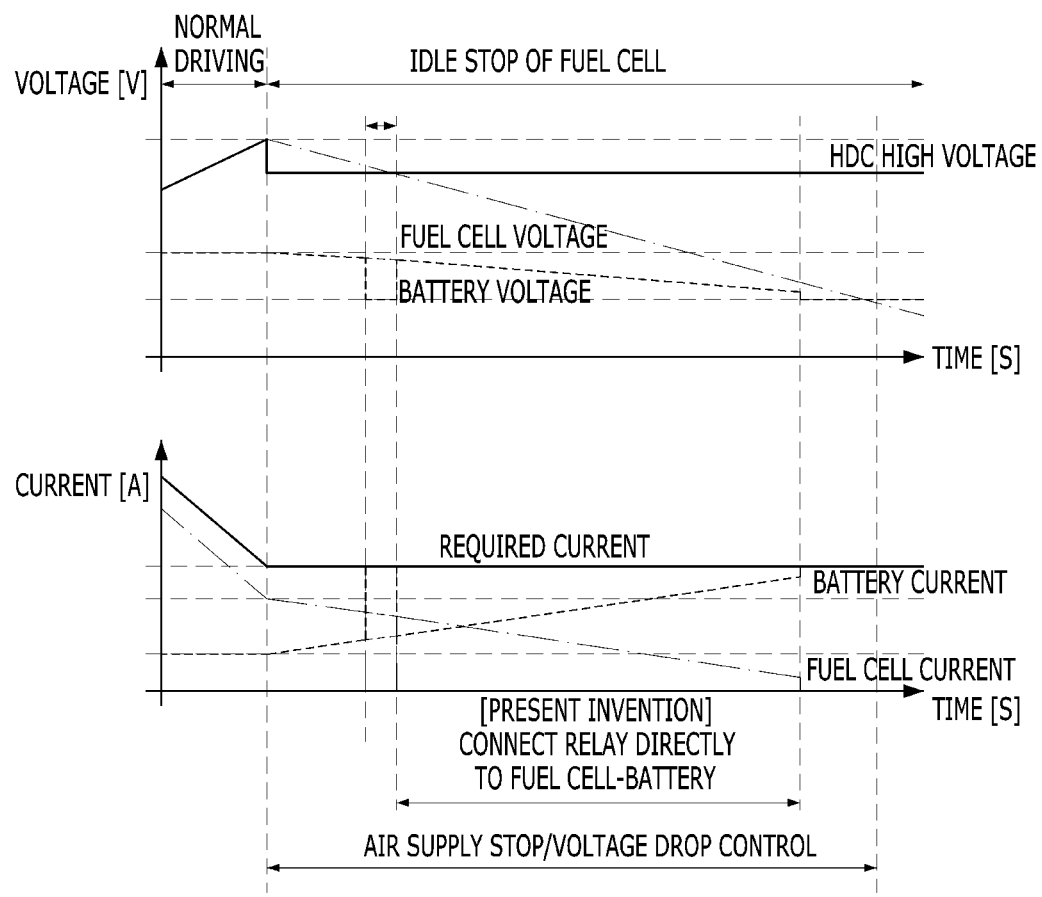
FIG. 3 is a diagram illustrating a method and apparatus for controlling output of a fuel cell with regard to a detailed example, according to an exemplary embodiment of the present invention.

FIG. 3 is a diagram illustrating a method and apparatus for controlling output of a fuel cell with regard to a detailed example, according to an exemplary embodiment of the present invention. Referring to FIG. 3, in a normal driving mode, a voltage of the fuel cell 10 may have about the same value as a voltage of the bidirectional power converting apparatus 30. A voltage of the battery (e.g., a high-voltage battery) may be received from the fuel cell 10 output and may be maintained to be a substantially constant voltage.

Current required by a motor control unit (hereinafter, referred to as a 'MCU') may be obtained by a summation of output current from the fuel cell and output current from the battery. In particular, when a vehicle state satisfies the idle stop condition, the fuel cell controlling apparatus 140 may be configured to stop air supply to the fuel cell 10. An output voltage of the fuel cell 10 may be decreased by stopping air supply and a voltage of the bidirectional power converting apparatus 30 may be decreased and maintained to a preset value.

For example, in an idle stop state, the fuel cell controlling apparatus 140 may be configured to decrease and maintain (e.g., first decrease, and then maintain) a voltage of the bidirectional power converting apparatus 30, applied to the main bus node 70, to about 330 V. Additionally, current may be decreased by idle stop and required current from the MCU may be satisfied by current from the battery. When a voltage of the fuel cell 10 is less than a voltage of the bidirectional power converting apparatus 30 as a voltage of the main bus node 70, output charged in the high-voltage battery 20 as well as output of the fuel cell 10 may also be used to drive the motor 130.

When a voltage of the fuel cell 10 is less than a voltage of the bidirectional power converting apparatus 30 as a value of the main bus node 70, the fuel cell controlling apparatus 140 according to an exemplary embodiment of the present invention may connect the additional bus nodes 40 between the fuel cell 10 and the battery to charge the battery with the remaining power, unlike in a conventional case in which power of the fuel cell 10 is discharged.

Figure 4:
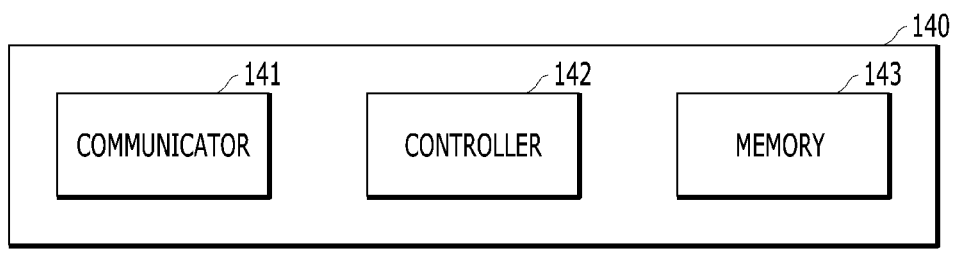
FIG. 4 is a diagram illustrating a structure of a fuel cell controlling apparatus according to an exemplary embodiment of the present invention.

FIG. 4 is a diagram illustrating a structure of the fuel cell controlling apparatus 140 according to an exemplary embodiment of the present invention. Referring to FIG. 4, the fuel cell controlling apparatus 140 may include a communicator 141, a controller 142, and a memory 143. Elements shown in FIG. 4 are not essential in implementation of the fuel cell controlling apparatus 140 and thus, the fuel cell controlling apparatus 140 described in the disclosure may include elements provided in number greater than or less than the listed elements. Hereinafter, the components will be described in detail.

In particular, the communicator 141 may be configured to transmit and receive signals and information for transmitting power to the motor 130, to and from the fuel cell 10, the additional relay 50, and so on of FIG. 1 in a normal state or an idle stop state. Additionally, the communicator 141 may be configured to receive state information including an output voltage value and an output current value of the fuel cell 10 and transmit a signal for on/off control of the additional relay 50. The controller 142 may be configured to perform data processing and calculation to execute an overall operation of the fuel cell controlling apparatus 140.

According to an exemplary embodiment of the present invention, when an output voltage of the fuel cell 10 is less than a preset second voltage, the controller 142 may be configured to activate a relay between the fuel cell and the battery. The memory 143 may collectively refer to a storage space and/or a storage area for storing a predetermined program code for executing an overall operation of the fuel cell controlling apparatus 140, data that is input/output during an operation according to the program code, etc. and may be provided in the form of an electrically erasable and programmable read only memory (EEPROM), a flash memory (FM), a hard disk drive, and so on. Further, the memory 143 may be configured to store a preset voltage value of the main bus node 70.

The method according to the aforementioned exemplary embodiments may also be embodied as computer readable codes on a non-transitory computer readable recording medium. The non-transitory computer readable recording medium is any data storage device that can store data which can be thereafter read by a computer system. Examples of the computer readable recording medium include read-only memory (ROM), random-access memory (RAM), CD-ROMs, magnetic tapes, floppy discs, optical data storage devices, etc. In addition, the computer readable recording medium may also be embodied in the form of a carrier wave (e.g., transmission via the Internet).

The non-transitory computer readable recording medium may also be distributed over network coupled computer systems so that the computer readable code is stored and executed in a distributed fashion. Also, functional programs, codes, and code segments for accomplishing the present invention can be easily construed by programmers skilled in the art to which the present invention pertains.

The method and apparatus for controlling output of a fuel cell according to the present invention has the following advantages.

First, the present invention may be applied up to a lower voltage range than output of a general fuel cell, thereby enhancing efficiency of a fuel cell system and enhancing fuel efficiency.

Second, the object of the present invention may be achieved by adding a bus node between the fuel cell and the battery to a conventional fuel cell system, and thus preventing an increase of costs.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. An apparatus for controlling a fuel cell, comprising:
a communicator configured to receive state information of a fuel cell; and
a controller configured to terminate a charge of a high-voltage battery by a power converting apparatus when a first voltage of the fuel cell is less than a preset second voltage as air supply of the fuel cell is stopped,
wherein a bidirectional power converting apparatus is positioned at an output node of the high-voltage battery,
wherein an additional bus node including a relay is connected between the fuel cell and the high-voltage battery, and
wherein the controller is configured to activate the relay between the fuel cell and the high-voltage battery to charge the high-voltage battery via the additional bus node, not the bidirectional power converting apparatus, when an output voltage of the fuel cell is less than a preset value of the bidirectional power converting apparatus.

2. The apparatus according to claim 1, wherein the controller is configured to activate the relay when a first voltage of the fuel cell is less than the preset second voltage and first current of the fuel cell is less than preset second current.

3. The apparatus according to claim 2, wherein the relay is connected in series between the fuel cell and the high-voltage battery.

4. The apparatus according to claim 3, wherein the second voltage is a voltage of a main bus node for connection of the fuel cell, the high-voltage battery, and the motor.

5. A method for controlling a fuel cell, comprising:
receiving, by a communicator, state information of a fuel cell;
terminating, by a controller, a charge of a high-voltage battery by a power converting apparatus when a first voltage of the fuel cell is less than a preset second voltage as air supply of the fuel cell is stopped; and
activating, by the controller, a relay between the fuel cell and the high-voltage battery to charge the high-voltage battery via an additional bus node, not a bidirectional power converting apparatus, when an output voltage of the fuel cell is less than a preset value of the bidirectional power converting apparatus.

6. The method according to claim 5, wherein the activation of the relay to charge the high-voltage battery includes:
activating, by the controller, the relay when a first voltage of the fuel cell is less than the preset second voltage and first current of the fuel cell is less than preset second current.

7. The method according to claim 6, wherein the relay is connected in series between the fuel cell and the high-voltage battery.

8. The method according to claim 7, wherein the second voltage is a voltage of a main bus node for connection of the fuel cell, the high-voltage battery, and the motor.

9. A non-transitory computer readable recording medium containing program instructions executed by a processor or controller, the computer readable medium comprising:
program instructions that control a communicator to receive state information of a fuel cell;
program instructions that terminate a charge of a high-voltage battery by a power converting apparatus when a first voltage of the fuel cell is less than a preset second voltage as air supply of the fuel cell is stopped; and
program instructions that activate a relay between the fuel cell and the high-voltage battery to charge the high-voltage battery via an additional bus node, not the bidirectional power converting apparatus, when an output voltage of the fuel cell is less than a preset value of the bidirectional power converting apparatus.

10. The non-transitory computer readable medium of claim 9, wherein the program instructions that activate the relay to charge the high-voltage battery include:
program instructions that activate the relay when a first voltage of the fuel cell is less than the preset second voltage and first current of the fuel cell is less than preset second current.

11. The non-transitory computer readable medium of claim 10, wherein the relay is connected in series between the fuel cell and the high-voltage battery.

12. The non-transitory computer readable medium of claim 11, wherein the second voltage is a voltage of a main bus node for connection of the fuel cell, the high-voltage battery, and the motor.

\* \* \* \* \*